Apr. 3, 1923.            1,450,276
R. E. ANDREW
TROLLEY CROSSING
Filed Feb. 21, 1922    3 sheets-sheet 2

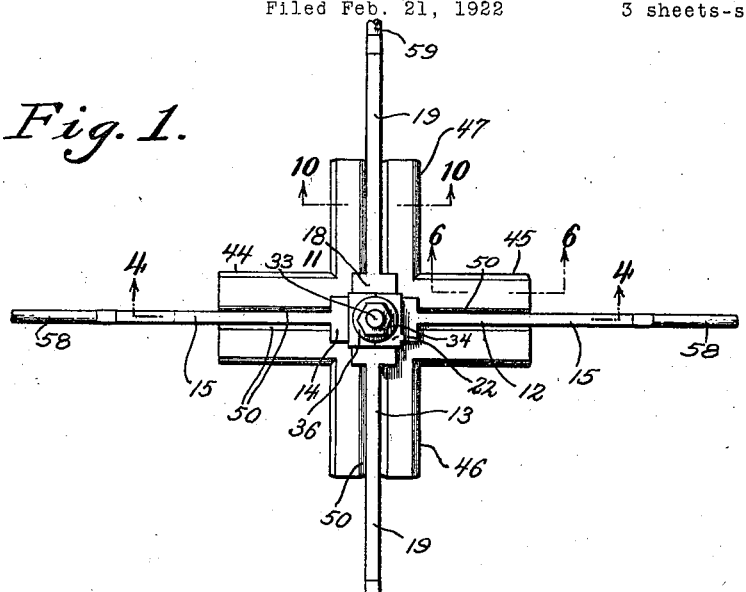
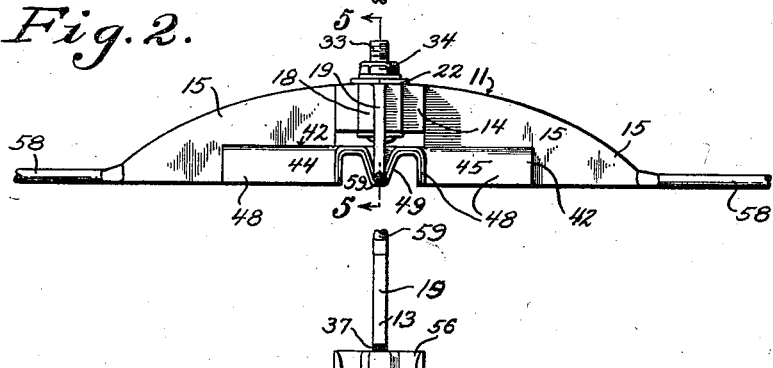
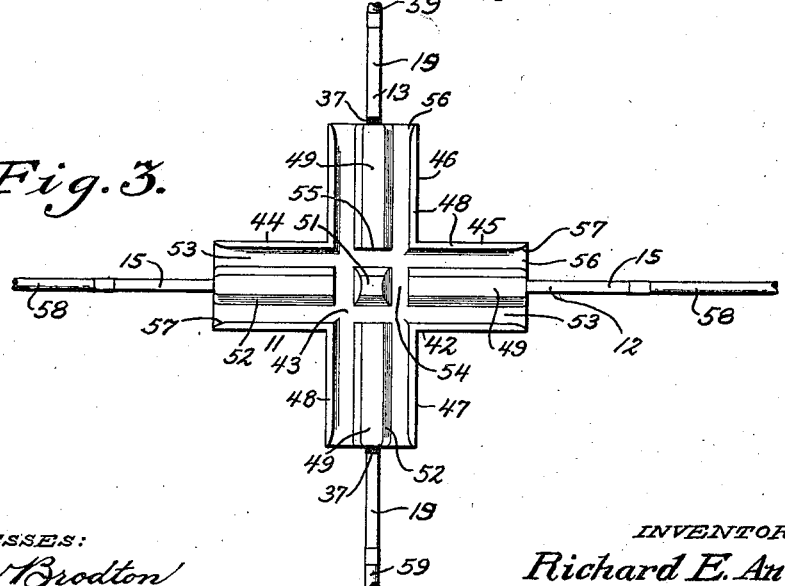

WITNESSES:
Lynn Brodton
Augustus B. Coppes

INVENTOR
Richard E. Andrew
BY Joshua R. H. Toth
HIS ATTORNEY

Apr. 3, 1923.

R. E. ANDREW

TROLLEY CROSSING

Filed Feb. 21, 1922

1,450,276

3 sheets-sheet 3

WITNESSES:
Lynn Brodton
Augustus B. Coppes

INVENTOR
Richard E. Andrew
BY Joshua R. H. Potts
HIS ATTORNEY

Patented Apr. 3, 1923.

1,450,276

UNITED STATES PATENT OFFICE.

RICHARD E. ANDREW, OF PHILADELPHIA, PENNSYLVANIA, ASSIGNOR OF ONE-HALF TO JOSEPH ANDREW, OF PHILADELPHIA, PENNSYLVANIA.

TROLLEY CROSSING.

Application filed February 21, 1922. Serial No. 538,204.

*To all whom it may concern:*

Be it known that I, RICHARD E. ANDREW, a citizen of the United States, residing at Philadelphia, in the county of Philadelphia and State of Pennsylvania, have invented certain new and useful Improvements in Trolley Crossings, of which the following is a specification.

It is well known that the trolley wheels of electric cars often jump or accidentally move off their electric supply conduits when passing the crossing of two intersecting trolley line wires and require that the trolley pole must be manually operated to cause the trolley wheel to again properly engage the conduit.

One object of my invention is to provide an improved device which can be used at the intersection or junction of two trolley line conduits and which will be of such construction as to provide guiding means for the purpose of insuring the smooth passage of a trolley wheel thereover and preventing said accidental jumping of the same.

Another object is to so construct my improved crossing device that two intersecting supply conduit wires of different car lines can be connected securely thereto and at the same time electrically insulated from each other.

Another object is to make my improved device of a simple and durable construction which can be readily manufactured and installed.

These objects, and other advantageous ends which will be described hereinafter, I attain in the following manner, reference being had to the accompanying drawings in which—

Figure 5:
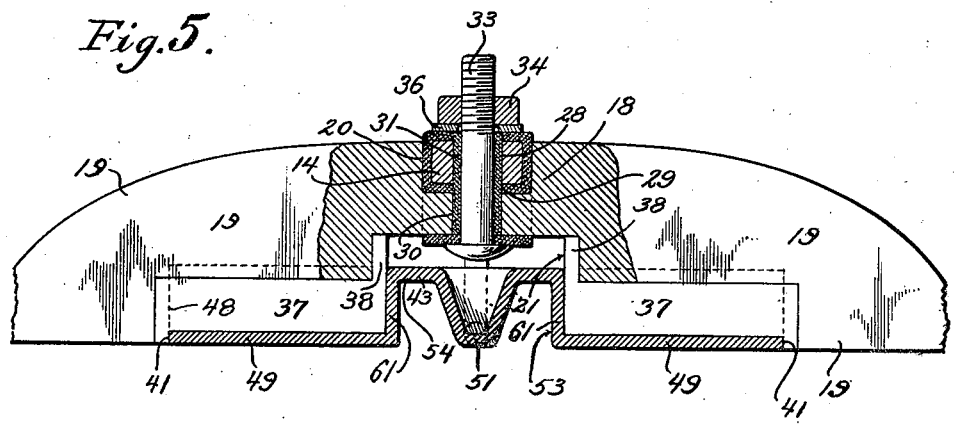
Figure 4:
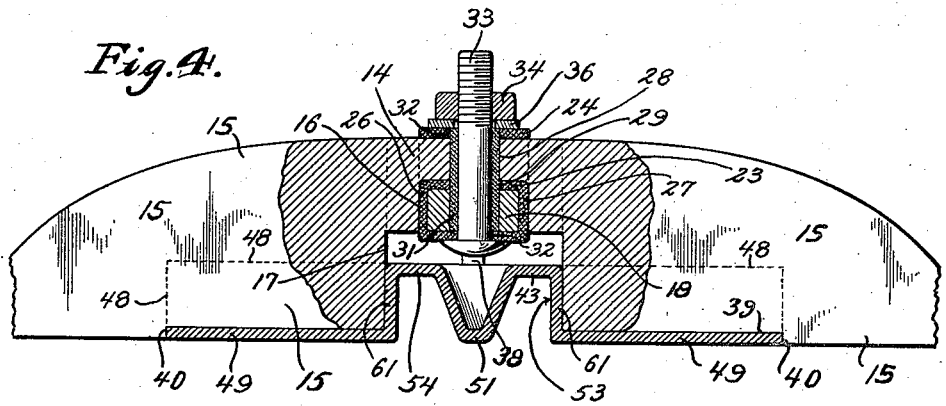
Figure 6:
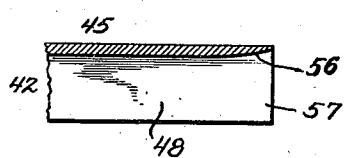
Figure 9:
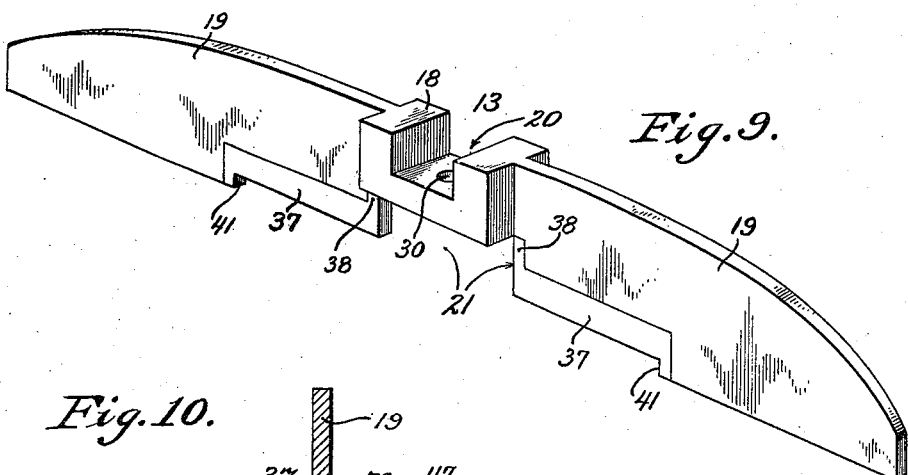
Figure 10:
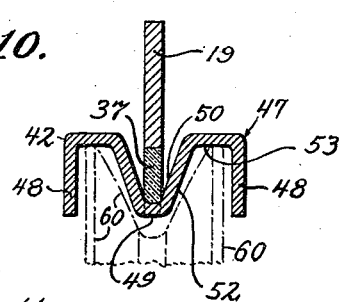

Figure 1 is a top plan view showing my improved crossing in a position forming the junction of two electric conduits such for example as trolley wires, Figure 2 is a front elevation of Figure 1, Figure 3 is an inverted plan view of said crossing, Figure 4 is an enlarged section taken on the line 4—4 of Figure 1, Figure 5 is an enlarged section taken on the line 5—5 of Figure 2, Figure 6 is an enlarged fragmentary section taken on the line 6—6 of Figure 1, Figures 7, 8 and 9 are perspective views of certain of the parts of my invention, and Figure 10 is an enlarged transverse section taken on the line 10—10 of Figure 1.

Figure 7:
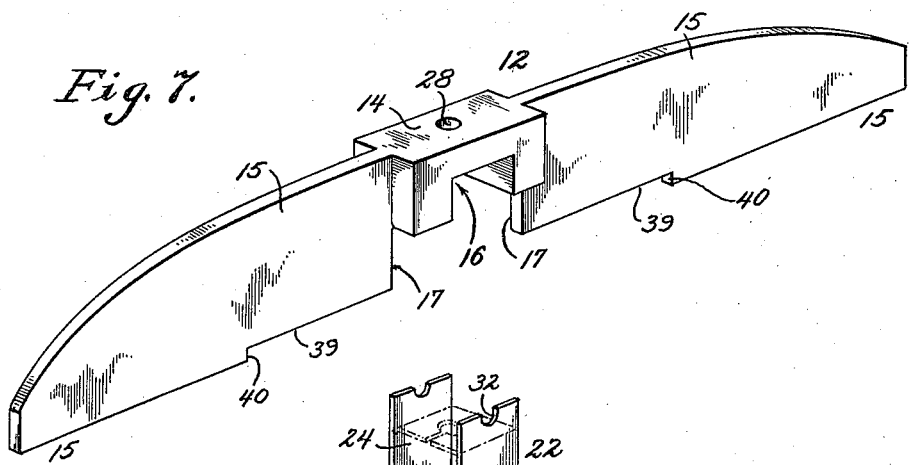
Figure 8:
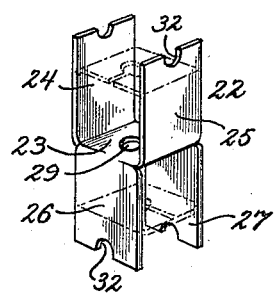

Referring to the drawings, 11 represents my improved crossing body which includes members 12 and 13 shown in detail in Figures 7 and 9. The member 12 has a central portion 14 from which project two arms 15. The lower surface of the part 14 is provided with a channel recess 16 extending in a direction transversely to the length of the arms 15 and the adjacent edge portions of the arms 15 are spaced apart below the portion 14 to provide a notch 17. The member 13 has a central portion 18 from which project two arms 19. This portion 18 has a channel recess 20 which extends downward from the top surface thereof in a direction transversely to the length of the arms 19. The opposed edge surfaces of the arms 19 are spaced apart to provide a notch 21 below the portion 18. A bushing 22 in the form of a clip, made of material which is a nonconductor of electricity, includes a plate portion 23 which is centrally located and from this plate portion extend two side flanges 24 and 25; said side flanges extending upwardly from opposed sides of the plate portion 23.

The bushing 22 also includes two other flanges 26 and 27 which depend from the plate portion 23 and in the form illustrated these flanges 26 and 27 are in planes at right angles to the planes of the flanges 24 and 25. The plate portion 23 of the bushing 22 is of such width that it will fit up into the channel recess 16 of the member 12 with the flanges 24 and 25 embracing the side surfaces of the central portion 14. The width of the central portion 18 of the member 13 is such that it will fit within the channel recess 16 with the arms 19 in planes at right angles to the arms 15; said plate portion 23 of the bushing being interposed between the upper surface of the recess 16 and the lower surface of the recess 20.

The flanges 26 and 27 are adapted to embrace the side surfaces of the central portion 18 of the member 13 and these flanges are bent under the portion 18 while the flanges 24 and 25 at their tops are bent over the central portion 14 of the member 12. Holes 28, 29 and 30 are formed respectively in the portions 14, 23 and 18 and a sleeve 31 (see Figures 4 and 5) is inserted through said holes 28, 29 and 30; said sleeve being made of material which is a non-conductor of electricity. The free ends of the flanges 24, 25, 26 and 27 are preferably cut away as shown at 32 so that when the extreme ends of said flanges are bent into the positions shown in Figures 4 and 5 that said ends of the flanges will embrace the opposite ends of the insulating sleeve 31.

A securing bolt 33 is extended through the sleeve and is provided with a nut 34 on its top end so as to securely hold the members 12 and 13 together. A washer 36 is interposed between the nut 34 and the tops of the sleeve and flanges 24 and 25. It will thus be noted that the members 12 and 13 are securely interlocked and at the same time they are electrically insulated one from the other due to the provision of the bushing 22 and the sleeve 31.

The lower edge portions of the arms 19 of the member 13 are cut away for the reception of inserts 37 of material which is a non-conductor of electricity; said inserts having portions 38 which extend upwardly to the level of the bottom of the portion 18 between the interposed portions of the arms so that the opposite sides of the notch 21 are electrically insulated from another portion of my device hereinafter described. The lower edges of the arms 15 of the member 12 are recessed at 39; said recesses 39 extending outward from the notch 17 and stopping short of the outer ends of the arms to provide shoulders 40. The insulating inserts 37 of the member 13 are also provided with shoulders 41.

A trolley wheel crossing device 42, which can be made out of pressed or cast metal includes a central portion 43 and extensions 44, 45, 46 and 47. These extensions have side flanges 48 and centrally disposed ribs 49 which are produced, when the device is pressed, by forming grooves 50 on the opposite surfaces of the device as clearly shown in Figure 10.

A lug 51 is formed centrally within the part 43 so as to be in line with the ribs 49, the rib 49 of each extension at its inner end being spaced from the lug. The extensions 44 and 45 are in line with each other and the extensions 46 and 47 are in line with each other and extend at right angles to the extensions 44 and 45. The side surfaces of the ribs are beveled as shown at 52 and the lug 51 has beveled side surfaces in alignment with the beveled surfaces 52 of the ribs 49 of each extension. Thus the device 42 on its lower surface has grooves or channels 53 at both sides of the ribs and between the side flanges, and these channels are continued at 54 between the beveled sides of the lug 51 and the adjacent ends 55 of the ribs 49. The uppermost surfaces of the channels are all in the same plane at positions immediately surrounding the central portion 43. At the extreme ends of the extensions 44, 45, 46 and 47 the uppermost surface of the channels is tapered upwardly as shown at 56. Furthermore the flanges 48 are tapered adjacent their outer ends as shown at 57.

In securing the wheel crossing device 42 to the crossing body 11, the opposite ends of the extensions 44 and 45 abut the shoulders 40 and the grooves 50 embrace the arms 15 and said extensions can be brazed, welded or otherwise metallically secured to the arms 15. The outer ends of the extensions 46 and 47 abut the shoulders 41 of the insulating inserts 37 and the grooves 50 of said extensions 46 and 47 embrace said inserts 37 so that no portion of the device 42 will engage the member 13. The trolley wires 58 are connected to the arms 15 by brazing them or otherwise suitably securing the same in position and said trolley wires 58 constitute one line conduit. In similar manner the trolley wires 59 are secured to the opposite ends of the arms 19 and constitute another line conduit.

The thickness of the material out of which the device 42 is formed is preferably such at the ribs that when the device is located as above described that the outer or lowermost surfaces of the ribs 49 will be in line with the lowermost edges of the arms 15 and 19 so that a trolley wheel such as indicated in dot-and-dash lines at 60 in Figure 10, can pass from the respective wires onto the lower edges of the arms and the flanges of the trolley wheel can engage against the beveled portions 56 of the various channels so as to ride smoothly through the channels; the ribs and flanges of the device 42 serving to keep the wheel 60 in proper position during its progress across the device 42 so that a smooth passage of a trolley wheel on either of the line wires 58 or 59 can pass across the device 42 with its flanges riding smoothly within the channels 53. The parts 55 which are beveled outwardly at the flanges 58 and at the extreme ends of the extensions serve as deflecting means so as to properly guide the trolley wheel laterally so that it will properly enter the channels. The lug 51 serves as an intermediate part common to the channels of all of the extensions so that the flanges of the trolley wheel before entirely leaving the positions between the confines of the ribs and flanges 48 of one extension will have other portions positioned between the lug 51 and the adjacent ends of the transversely extending ribs 49. Thus the trolley wheel will be smoothly guided in either direction through the channels.

It will be noted that the inner end walls 61 of the grooves 50 which produce the ribs 49 are of such distances apart as to abut the sides of the notch 17 and the opposed ends of the insulation parts 38 of the notch 21 as clearly shown in Figures 4 and 5. Thus the entire central portion 43 of the wheel crossing device 42 can be confined within the space provided by the notches 17 and 21 and shifting movement of the wheel crossing device 42 is thus prevented.

By the above arrangement and construction of parts, the bolt 33 can be employed for the securing of any guard or supporting wires (not illustrated), such for example as are used at the crossings of streets having intersecting trolley lines so that the entire structure can be supported and will assist in holding the wires at their proper elevation. In other words, the bolt 33 provides a convenient means of attachment for any suspension means necessary at the junction point of two conduit crossings.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A trolley crossing including a crossing body; comprising members having arms, one of said members having a recess into which a portion of the other member extends to form an interlock fit; electrical insulating means for said members having a part within said recess; a bolt extending through said members; insulating means for holding the members together; and trolley wheel crossing means carried by said body; substantially as described.

2. A trolley crossing including a notched crossing body having arms leading outward from said notched portion; and a trolley wheel crossing device including a central portion fitting within the notch of the body and extensions having grooves embracing the sides of said arms; substantially as described.

3. A trolley crossing including a notched crossing body having arms leading outward from said notched portion; and a trolley wheel crossing device including a central portion fitting within the notch of the body and extensions having grooves embracing the sides of said arms, said wheel crossing device having ribs opposed to the grooves in alignment with said arms; substantially as described.

4. A trolley crossing including a notched crossing body having arms leading outward from said notched portion; a trolley wheel crossing device including a central portion fitting within the notch of the body and extensions having grooves embracing the sides of said arms, said wheel crossing device having ribs opposed to the grooves in alignment with said arms; and a lug spaced from the inner ends of said ribs and in alignment therewith; substantially as described.

5. A trolley crossing including a notched crossing body having arms leading outward from said notched portion; a trolley wheel crossing device including a central portion fitting within the notch of the body and extensions having grooves embracing the sides of said arms, said wheel crossing device having ribs opposed to the grooves in alignment with said arms; and a lug spaced from the inner ends of said ribs and in alignment therewith, said extensions having side flanges spaced from said ribs to provide channels for the flanges of a trolley wheel, said channels being in alignment with the spaces between the inner ends of the ribs and said lug; substantially as described.

6. A trolley crossing including a notched crossing body having arms leading outward from said notched portion; a trolley wheel crossing device including a central portion fitting within the notch of the body and extensions having grooves embracing the sides of said arms, said wheel crossing device having ribs opposed to the grooves in alignment with said arms; and a lug spaced from the inner ends of said ribs and in alignment therewith, said extensions having side flanges spaced from said ribs to provide channels for the flanges of a trolley wheel, said channels being in alignment with the spaces between the inner ends of the ribs and said lug, the innermost surfaces of said channels surrounding said lug, all being in the same plane; substantially as described.

7. A trolley crossing including a notched crossing body having arms leading outward from said notched portion; a trolley wheel crossing device including a central portion fitting within the notch of the body and extensions having grooves embracing the sides of said arms, said wheel crossing device having ribs opposed to the grooves in alignment with said arms; and a lug spaced from the inner ends of said ribs and in alignment therewith, said extensions having side flanges spaced from said ribs to provide channels for the flanges of a trolley wheel, said channels being in alignment with the spaces between the inner ends of the ribs and said lug, the innermost surfaces of said channels surrounding said lug, all being in the same plane, the outer portions of said channels adjacent the ends of the extensions being tapered; substantially as described.

8. A trolley crossing including a notched crossing body having arms leading outward from said notched portion; a trolley wheel crossing device including a central portion fitting within the notch of the body and extensions having grooves embracing the sides of said arms, said wheel crossing device having ribs opposed to the grooves in alignment with said arms; and a lug spaced from the inner ends of said ribs and in alignment therewith, said extensions having side flanges spaced from said ribs to provide channels for the flanges of a trolley wheel, said channels being in alignment with the spaces between the inner ends of the ribs and said lug, the innermost surfaces of said channels surrounding said lug, all being in the same plane, the outer ends of said flanges being tapered; substantially as described.

9. A trolley crossing including a crossing body comprising members having arms, said members having recessed portions in interlocking fit; an electrical insulating bushing having a plate portion fitting between the recessed portions of said members and flanged members embracing the surfaces of said recessed portions; an insulating sleeve extending through said recessed portions of the members through said first insulating means; and a bolt extending through said sleeve for securing said members in their interlocked positions; substantially as described.

In testimony whereof I have signed my name to this specification in the presence of two subscribing witnesses.

RICHARD E. ANDREW.

Witnesses:
  ELIZABETH GARBE,
  CHAS. E. POTTS.